(12) United States Patent
Christmann et al.

(10) Patent No.: US 7,504,914 B2
(45) Date of Patent: Mar. 17, 2009

(54) ELECTRICAL SWITCHGEAR

(75) Inventors: Jürgen Christmann, Bammental (DE); Ralf Weber, Heidelberg (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 11/513,133

(22) Filed: Aug. 31, 2006

(65) Prior Publication Data

US 2007/0046404 A1  Mar. 1, 2007

(30) Foreign Application Priority Data

Aug. 31, 2005 (DE) .................. 10 2005 041 232

(51) Int. Cl.
*H01H 75/12* (2006.01)
*H01H 77/00* (2006.01)
*H01H 81/00* (2006.01)
*H01H 83/00* (2006.01)

(52) U.S. Cl. ............ 335/35; 335/2; 335/6; 335/21
(58) Field of Classification Search ............ 335/35
See application file for complete search history.

(56) References Cited

U.S. PATENT DOCUMENTS

| | | | | | |
|---|---|---|---|---|---|
| 2,783,330 | A | * | 2/1957 | Casey | 337/55 |
| 2,941,058 | A | * | 6/1960 | Norden | 337/59 |
| 3,790,911 | A | * | 2/1974 | Kick et al. | 335/201 |
| 3,950,714 | A | * | 4/1976 | Mrenna et al. | 335/35 |
| 3,983,454 | A | * | 9/1976 | Cotton et al. | 361/37 |
| 4,001,743 | A | * | 1/1977 | Arnhold | 335/201 |
| 4,079,345 | A | * | 3/1978 | Pietsch | 335/10 |
| 4,132,967 | A | * | 1/1979 | Gryctko | 335/11 |
| 4,156,219 | A | * | 5/1979 | Coleman | 335/175 |
| 4,614,928 | A | * | 9/1986 | Westermeyer | 335/201 |
| 4,636,760 | A | * | 1/1987 | Lee | 335/14 |
| 4,714,907 | A | * | 12/1987 | Bartolo et al. | 335/45 |
| 4,725,799 | A | * | 2/1988 | Bratkowski et al. | 335/14 |
| 5,151,674 | A | * | 9/1992 | Flohr | 335/16 |
| 5,185,590 | A | * | 2/1993 | DiVincenzo | 335/201 |
| 7,009,129 | B2 | * | 3/2006 | Vierling | 200/400 |

FOREIGN PATENT DOCUMENTS

| | | | |
|---|---|---|---|
| DD | 119 907 | | 5/1976 |
| DE | 535 664 | | 10/1931 |
| DE | 29 33 767 | | 3/1981 |
| DE | 36 02 072 | | 7/1987 |
| DE | 695 11 819 | | 4/2000 |
| DE | 10335704 | A * | 3/2005 |
| EP | 0 710 973 | | 5/1996 |
| GB | 2 176 659 | | 12/1986 |

* cited by examiner

*Primary Examiner*—Elvin G Enad
*Assistant Examiner*—Mohamad A Musleh
(74) *Attorney, Agent, or Firm*—Buchanan Ingersoll & Rooney PC

(57) ABSTRACT

An electrical switchgear includes a thermal trip, an electromagnetic trip, and a switching mechanism with a latching point and at least one contact point that is continuously opened or closed. An operating handle is connected to one end of a lug by means of a coupling element and the other end of the lug is coupled to a contact base that carries a moving contact member. The thermal trip is coupled to a trip lever by a connecting rod that passes over the contact base so that both the thermal trip and the electromagnetic trip open a latching point in the event of an excess current and/or short circuit current.

5 Claims, 2 Drawing Sheets

OFF

ON

End of tripping

ELECTRICAL SWITCHGEAR

CROSS REFERENCE TO RELATED APPLICATIONS

This application claims priority under 35 U.S.C. §119 to German Application No. 10 2005 041 232.7 filed in Germany on 31 Aug. 2005, the entire contents of which is hereby incorporated by reference in its entirety.

BACKGROUND

An electrical switchgear is disclosed.

In particular, a line circuit breaker is disclosed which is used for disconnecting loads in the event of a short circuit or excess current. Such a breaker can be used in combination with, for example, motor circuit breakers and fault-current circuit breakers.

A line circuit breaker has in its interior an electromagnetic trip which has a plunger-type electromagnet, with a core and a moving armature around which a coil is wound. In the case of a short circuit, the armature moves and, on the one hand, impacts the contact lever so that the contact point is rapidly opened; on the other hand, it also effects a continuing opening of the contact point via a latch. The thermal trip which is constructed as a bimetallic trip in most cases exclusively acts on the latch to effect the continuing opening of the contact point. The bimetal is constructed in most cases as a strip which bends out due to the different coefficients of expansion of the metals joined to one another. Naturally, a strip of a shaped memory alloy can also be used instead of a thermal bimetal.

In the switch S2 of the company ABB Stotz Kontakt GmbH, Heidelberg, the latch is supported between two boards which are connected to one another and which also form or accommodate the bearing point for the corresponding components forming the latching point. In this switch, the electromagnetic trip is located between the thermal bimetal and the contact lever.

SUMMARY

A switch is disclosed which can, for example, considerably simplify the assembly and to improve the sequence of movements of the components of the latch.

An exemplary contact base constructed as contact lever is located between the thermal and the electromagnetic trip; together with a trip lever supported rotatably and interacting with the electromagnetic trip, the latch lever forms the latching point, the thermal trip being coupled to the trip lever by means of a rod passing over the contact base so that both the thermal trip and the electromagnetic trip open the latching point via the trip lever in the event of an excess current and/or short circuit current.

An exemplary embodiment can considerably improve the alignment between unlatching and impact of the contact lever before the impact of the contact lever because the chain of tolerance is considerably shortened compared with the above-mentioned switch S2. The striker pin hits the trip lever and the latter moves up to unlatching, where it meets the moving contact lever for opening it.

An advantageous embodiment can have the aim that the trip lever is rotatably supported between the axis of rotation of the operating handle and the electromagnetic trip, the trip lever being constructed as two-armed lever, the first arm of which, together with the latch lever, forms the latching point and the second arm of which interacts with the thermal trip and the electromagnetic trip.

According to a further embodiment, the first lever arm of the trip lever, in the on position, extends approximately perpendicularly to the front wall of the switchgear or approximately perpendicularly to the center axis of the electromagnetic trip, whereas the second lever arm has a first section extending perpendicularly to the first arm and an adjoining second section which covers the striker pin of the electromagnetic trip.

According to an advantageous embodiment, the axis of rotation of the trip lever is located stationary on a line which is formed by the bearing points of the trip lever and of the operating handle, this line extending approximately perpendicularly to the plane of mounting or, respectively, to the front wall.

According to a further embodiment, a spring arrangement is provided which can permanently load the trip lever in such a manner that it moves the striker armature of the electromagnet system into its ready-to-trip position at the end of tripping, as a result of which the latching point is latched again and the switchgear can be switched on again.

BRIEF DESCRIPTION OF THE DRAWINGS

The invention and other advantageous embodiments and improvements of the invention and further advantages will be explained and described in greater detail with reference to the drawing, in which an illustrative embodiment is shown and in which.

DETAILED DESCRIPTION

Figure 2:
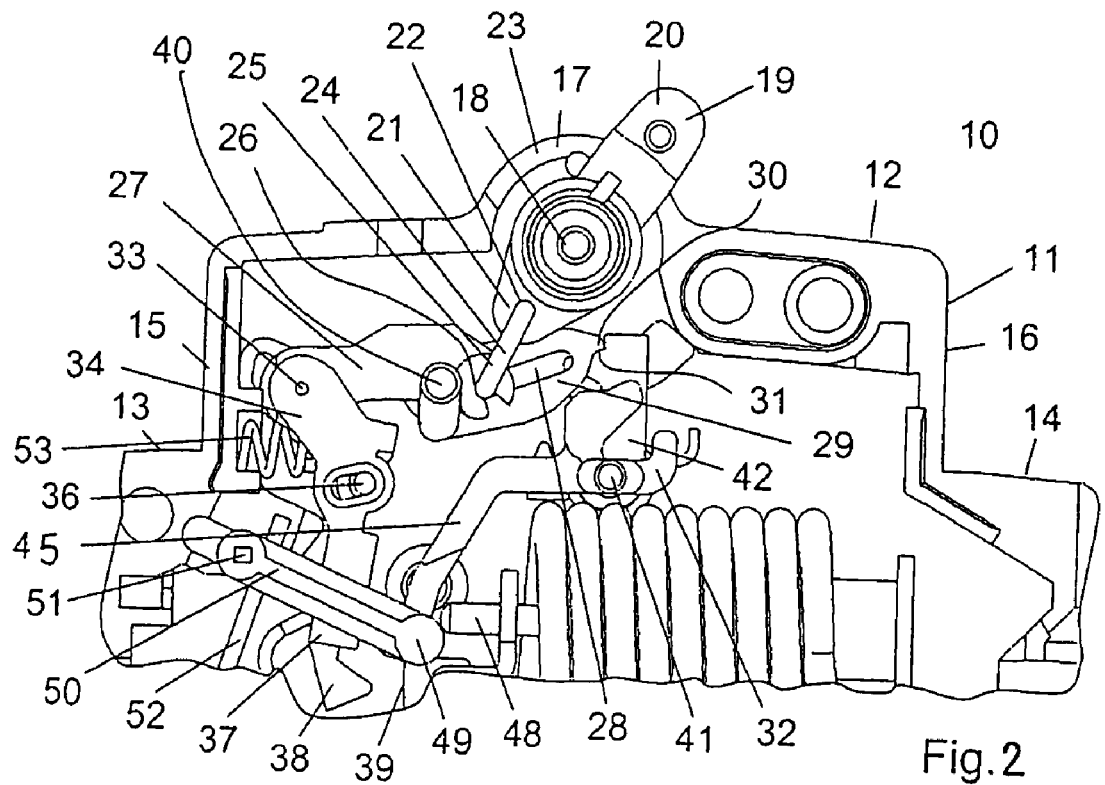
FIG. 2 shows a partial view corresponding to FIG. 1, in the on position.

Reference will be made to FIG. 2.

A line circuit breaker 10 which is partially shown in the area of its switching mechanism has a housing 11 which is composed of a shell-shaped lower housing part and a shell-shaped upper housing part. In the view of FIGS. 1 to 4, only the lower housing part can be seen.

The housing is constructed in pedestal construction and has a front front wall 12, two rear front walls 13 and 14 which are not shown completely in the drawing, two front narrow side walls 15 and 16 which connect the front front wall 12 with the rear front walls; and parallel with the front front wall and the rear front walls 13, 14, respectively, a mounting wall closing off the housing towards the bottom, is located which is not shown in FIGS. 1 to 4.

The front front wall 12 has an approximately semicircular bump 17, in the area of which a switch handle 19 is supported on a bearing 18. The switch handle 19 is a two-armed lever with an operating handle 20 and an eye-shaped continuation 21 located in the interior of the switchgear; in the eye-shaped continuation 21, a through opening 22 is located; the center point of the through opening 22, the center point of the bearing 18 and the center line of the operating handle 20 are located on one line or, respectively, aligned with one another.

The operating handle 20 protrudes from an opening 23 in the bump or protrusion 17.

In the through opening 22, a leg (not shown) of a bow 24 is inserted which has a U-shape, the web 25 of the bow being visible in FIGS. 1 to 4. The other leg of the U-shaped bow 24 engages in a penetration 26 of a lug 27 and an elongated hole 28 of a latch lever 29 and is guided therein. The latch lever 29 has a locking nose 30 which, together with a recess 31 at a striker lever 32, forms a latch. Accordingly, the latching point is designated by the reference numbers 30/31 in the text which follows. The other end of the lug 27 is connected by means of an articulated axle 33 in an articulated manner with a contact lever 34 which exhibits approximately in its center an elongated hole 35 by means of which it is supported rotatably in the housing 11 at a stationary pin 36. As a result, the contact lever 35 becomes a two-armed lever, the lever 37 located oppositely to the bearing point 33 carries the so-called moving contact member 38 which interacts with a stationary contact member 39. The latch lever 29 is rotatably supported in the housing (both in the lower housing part and in the upper housing part) at its end located oppositely to the latching point 30, 31 via a pin arrangement 40.

The arrangement is made in such a manner that the lug 27 and the latch lever 29 are approximately in a line. In the on position, in which the nose 30 rests against the recess 31, the latch is in the on position, that is to say when the moving contact member 38 touches the stationary contact member 39 in a first stable position in which the center axis of the web 25 passes laterally, on the left in the embodiment according to FIG. 2, next to the center axis of the bearing or the rotary bearing 18 of the switch handle 19 so that the center axis of the leg 25 forms an obtuse angle opened in the direction of the latching point 30/31 with the line formed by the center axis of the opening 22 and the center axis of the bearing 18. The lug 27 and the latch lever 29 are approximately parallel to the front front wall. In the on position, the bow 24 presses the lug away from the latching point 30/31 so that the force arising as a result produces the switching-on force. The elongated hole 35 lies with its end which is located on the side of the contact lever 34 on which the moving contact member is located. The elongated hole 35 extends approximately perpendicularly to the longitudinal extent of the contact lever 34.

The striker lever or trip lever 32 can be swiveled about a stationary axle 41 below the operating handle or its bearing point at 18. It has a first lever arm 42 at which the recess 31 is molded on; in its on position, this first lever arm 42 extends perpendicularly or approximately perpendicularly to the front wall. The striker lever 32 also has a second lever arm 43 which has a first section 44 and a second section 45 which adjoins the first section 44 and protrudes approximately towards the mounting side, that is away from the front side 12.

The switchgear has an electromagnetic trip 46, the striker armature 47 of which extends parallel to the front wall or to the mounting wall, respectively, and the end 48 of which protruding from the trip 46 is covered by the section 45.

At the free end of the section 45, an end 49 of a connecting rod 50 is connected and hereby articulated, which engages behind a thermal bimetallic strip 52 which is the thermal trip, by means of a pin 51 which protrudes perpendicularly to the plane of the drawing into the latter and, therefore, is only shown dashed. The thermal trip 52 is thus located between the pin 51 and the section 45.

The longitudinal axis of the connecting rod 50 extends approximately perpendicularly to the longitudinal extent of the thermal bimetal; in the embodiment according to FIGS. 1 to 4, the longitudinal extent of the thermal bimetal 52 forms, together with the mounting side, an acute angle which is open towards the electromagnetic trip.

Figure 1:
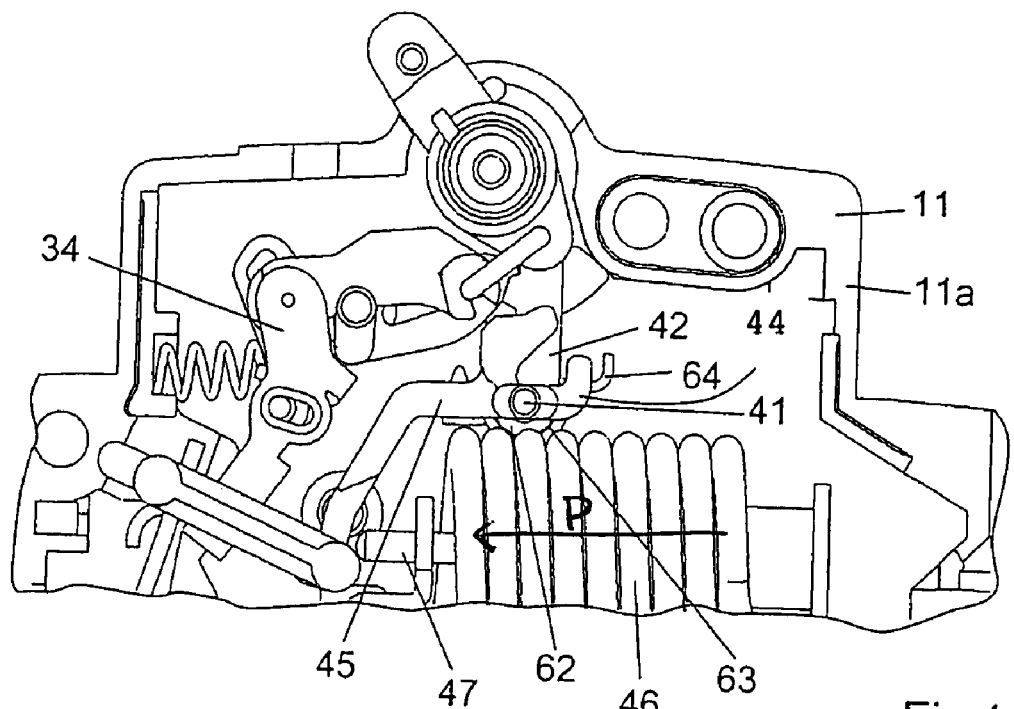
FIG. 1 shows a partial view into an exemplary switchgear in the off position.

Between the left-hand narrow side wall 15, that is to say the wall which is adjacent to the hinge 33 and the contact lever in the area between the hinge point 33 and the elongated hole 35, a compression spring 53 is provided which loads the contact lever clockwise around the bearing point 36 so that the compression spring 53 supports the off movement, that is to say the movement of the contact lever 34 out of the position according to FIG. 2 into the position according to FIG. 1.

Figure 3:
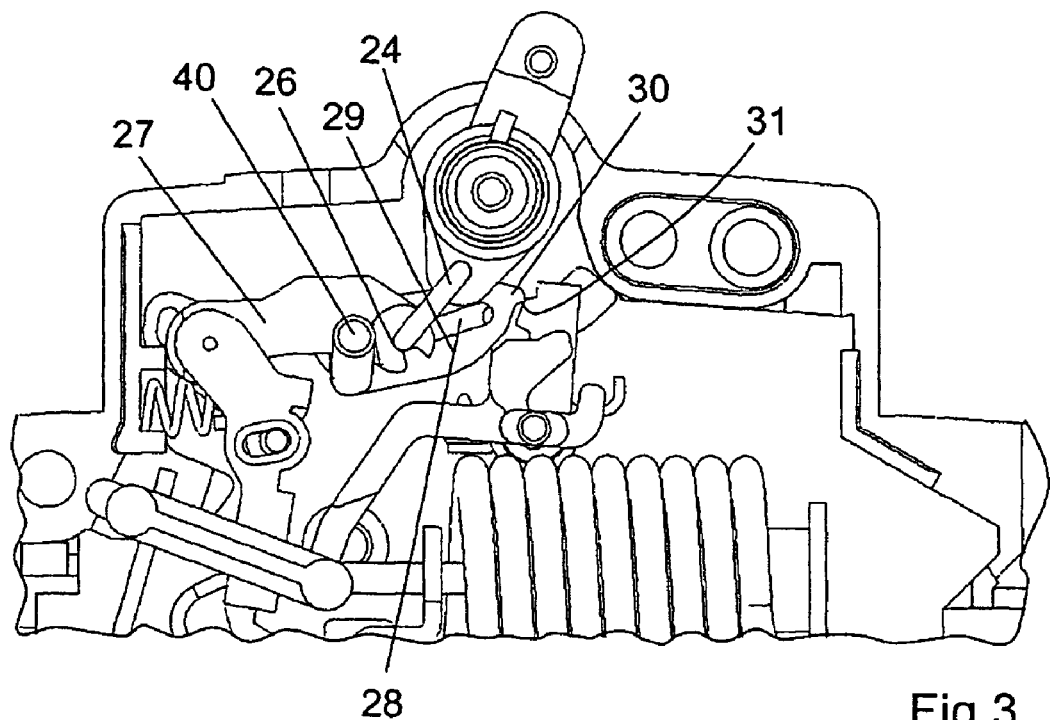
FIGS. 3 and 4 show a view which corresponds to the view of the switchgear shown in FIGS. 1 and 2, at the beginning of tripping and at the end of tripping.
Figure 4:
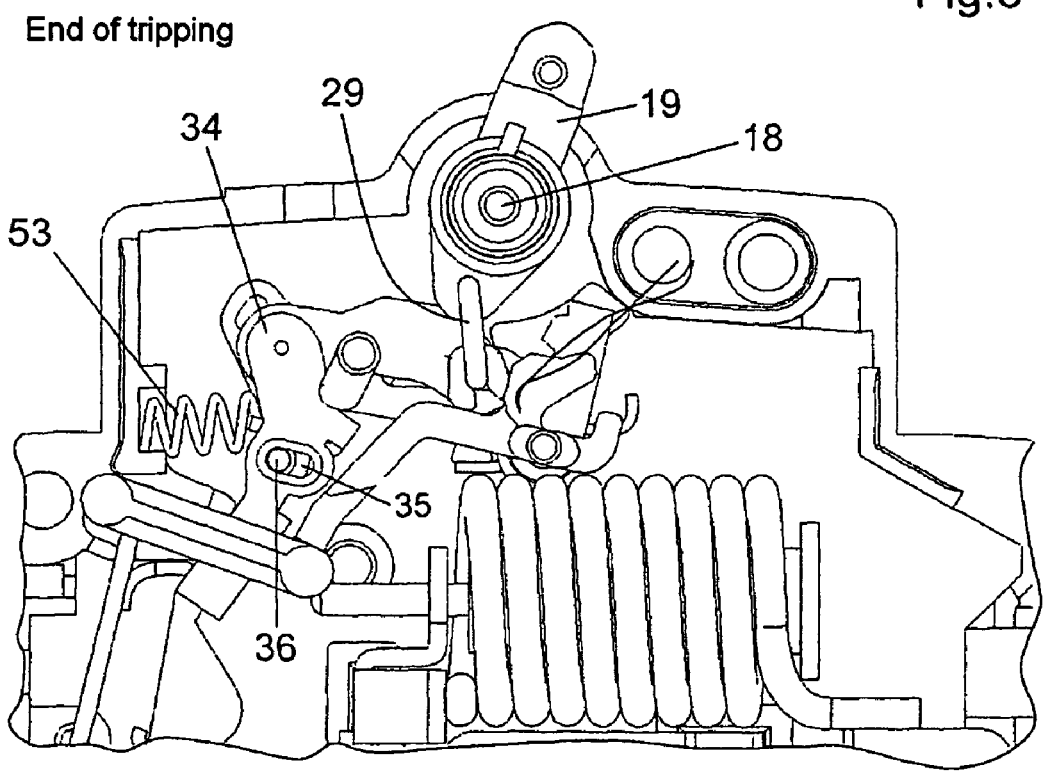

If then the striker armature 48, due to a short circuit current, is moving in the direction of the arrow P, it presses on the section 45 and, in doing so, swivels the striker lever clockwise around the axis of rotation 41 as a result of which the latching point 30/31 is unlatched, see FIG. 3, so that the latch lever 29 can swivel clockwise around its axis. In doing so, the leg of the bow 24 accommodated in the opening 26 of the lug 27 slides in the elongated hole 28 until it has reached the opposite, left-hand (in FIGS. 1 to 4) end of the elongated hole 28. This releases the force of the spring 53; the end of the elongated hole 35 located opposite to the contact point 30, 31 comes to rest against the stationary pin 36 so that the compression spring 53 can also swivel the contact lever 34 anticlockwise; as a result, the contact lever reaches its off position which has been reached at the end of tripping. The operating handle or switch handle 19 is released and can rotate counter clockwise around the axis 18 into the off position. During this process, the bow 24 releases or pulls it into the off position shown in FIG. 1 in which it passes with its nose 30 back behind the recess 31 of the striker lever. The switch can now be switched on again by moving the operating handle 19 clockwise out of its off position into the on position shown in FIG. 2.

If the thermal trip 52 bends with an excess current, the free end bends approximately in the direction of the arrow P and, in doing so, takes along section 45 of the striker lever via the rod or connecting rod 15 as a result of which the recess 31 moves away from the nose 30 and, as a result, the latching point is opened. The beginning of tripping is again shown in FIG. 3, the further sequence is the same as that described above.

Naturally, the latch described by means of a line circuit breaker can also be used in a fault-current circuit breaker; in this case, a trip responding to a fault current would have to be used instead of the electromagnetic trip 46 which responds to short circuit current.

Naturally, the possibility also exists to use the latch for a motor circuit breaker in which, instead of a contact lever, a contact base is provided which carries a contact bridge which electrically conductively connects two stationary contact members, that is to say a pair of contact members, in the on state.

Reference will be made to FIG. 1.

The section 45 which extends perpendicularly to the first arm 42 continues past its bearing point 41 into a continuation (i.e., first section 44) which exhibits an angle bend, not shown in FIGS. 1 to 4, which protrudes into the plane of the drawing perpendicularly to the plane of the drawing. Around a protrusion 62, extending concentrically with respect to the bearing point 41 and which is moulded on at the inside face 11a of the housing 11 and protrudes towards the observer, a spring 63 is wound, one arm of which (not shown) is held stationary in the housing and the other spring arm 64 of which presses resiliently against the protrusion 60 so that this spring continuously loads the striker lever or trip lever anticlockwise in the direction of pressing back the striker pin 47 or the armature 47, respectively. This spring has the effect that the striker lever is pressed into its ready-to-latch position so that the latch lever, during its movement into the off position, see above, interacts with the first arm 42 of the trip lever, forming the latching point.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An electrical switchgear, comprising:
   a thermal trip, and an electromagnetic trip;
   a switching mechanism with a latching point;
   at least one contact point which is continuously opened or closed by means of the switching mechanism;
   an operating handle which is connected to one end of a lug by a coupling element and another end of the lug which is coupled to a contact base carrying a moving contact member;
   a latch lever which, together with a rotatably supported trip lever that interacts with the electromagnetic trip and the thermal trip, forms the latching point,
   wherein the trip lever includes an axle, a first arm, and a second arm, the first arm extending from the axle in a direction towards the latch lever and the second arm extends from the axle in a direction towards the electromagnetic trip and the thermal trip, the first arm having a recess that mates with a nose of the latch lever to form the latching point,
   wherein the contact base for the moving contact member is located between the thermal trip and the electromagnetic trip, and
   wherein the thermal trip is coupled to the trip lever by a connecting rod that passes over the contact base, so that both the thermal trip and the electromagnetic trip open the latching point in an event of an excess current and/or short circuit current.

2. The switchgear according to claim 1, wherein the first lever arm of the trip lever, in the on position, extends perpendicularly to a front wall of the switchgear or perpendicularly to a center axis of the electromagnetic trip, whereas the second lever arm has a first section extending perpendicularly to the first lever arm and an adjoining second section which covers a striker pin of the electromagnetic trip.

3. The switchgear according to claim 1, wherein an axis of rotation (bearing point) of the trip lever is located stationary on a line which is formed by bearing points of the trip lever and the operating handle, this line extending approximately perpendicularly to a plane of mounting or, respectively, to the front wall.

4. The switchgear according to claim 1, wherein a spring arrangement is provided which permanently loads the trip lever in such a manner that it moves a striker armature of the electromagnetic trip into its ready-to-trip position at the end of tripping to latch the latching point is latched again.

5. The switchgear according to claim 1, in combination with a line, motor or fault-current circuit breaker.

* * * * *